US007092735B2

(12) United States Patent
Osann, Jr.

(10) Patent No.: US 7,092,735 B2
(45) Date of Patent: Aug. 15, 2006

(54) VIDEO-VOICEMAIL SOLUTION FOR WIRELESS COMMUNICATION DEVICES

(76) Inventor: Robert Osann, Jr., 328 Costello Ct., Los Altos, CA (US) 94024

( * ) Notice: Subject to any disclaimer, the term of this patent is extended or adjusted under 35 U.S.C. 154(b) by 551 days.

(21) Appl. No.: 10/104,934

(22) Filed: Mar. 22, 2002

(65) Prior Publication Data

US 2004/0203608 A1    Oct. 14, 2004

(51) Int. Cl.
    *H04N 7/14*      (2006.01)
    *H04M 1/00*      (2006.01)
    *H04B 1/38*      (2006.01)

(52) U.S. Cl. .................. 455/556.1; 455/557; 455/566; 348/14.02

(58) Field of Classification Search ..................... None
See application file for complete search history.

(56) References Cited

U.S. PATENT DOCUMENTS

| | | | | |
|---|---|---|---|---|
| 5,963,245 | A * | 10/1999 | McDonald | 348/14.01 |
| 6,069,648 | A * | 5/2000 | Suso et al. | 348/14.02 |
| 6,380,975 | B1 * | 4/2002 | Suzuki | 348/231.99 |
| 6,424,843 | B1 * | 7/2002 | Reitmaa et al. | 455/566 |
| 6,751,473 | B1 * | 6/2004 | Goyal et al. | 455/556.1 |
| 6,812,954 | B1 * | 11/2004 | Priestman et al. | 348/14.01 |
| 6,882,864 | B1 * | 4/2005 | Miyake | 455/556.1 |
| 6,906,741 | B1 * | 6/2005 | Canova et al. | 348/14.08 |
| 2001/0032335 | A1 * | 10/2001 | Jones | 725/105 |
| 2001/0050977 | A1 * | 12/2001 | Gerszber et al. | 379/88.13 |
| 2002/0051181 | A1 * | 5/2002 | Nishimura | 358/1.15 |
| 2002/0130956 | A1 * | 9/2002 | Suzuki | 348/211 |
| 2002/0147661 | A1 * | 10/2002 | Hatakama et al. | 705/26 |
| 2002/0171673 | A1 * | 11/2002 | Brown et al. | 345/700 |
| 2004/0014456 | A1 * | 1/2004 | Vnnen | 455/413 |
| 2005/0083642 | A1 * | 4/2005 | Senpuku et al. | 361/681 |

* cited by examiner

*Primary Examiner*—Fan Tsang
*Assistant Examiner*—Lisa Hashem

(57) ABSTRACT

An enhanced communication and voicemail solution for mobile phones is described where still images and/or video clips are injected into the voice stream creating a "video-voice" call. When a receiving party is not available to take a video-voice call, this combined stream of voice and image information is stored at the mobile service provider in a manner similar to voice mail today. Then, stored video-voicemails may be retrieved at a later time by the receiving party. Also, realtime video-voice conversations may be recorded for later retrieval in order to document the conversation or because a party in the conversation is not able to view the images realtime.

While the sending party may use a normal size mobile phone containing a miniature digital camera, the receiving party may view video-voicemail images on a variety of devices including a wireless mobile phone or PDA, or alternately a conventional PC connected to the World Wide Web.

11 Claims, 7 Drawing Sheets

Viewing Video-Voicemail Messages on Different Devices
Aspect ratios of viewing screens vary significantly between different communication devices.
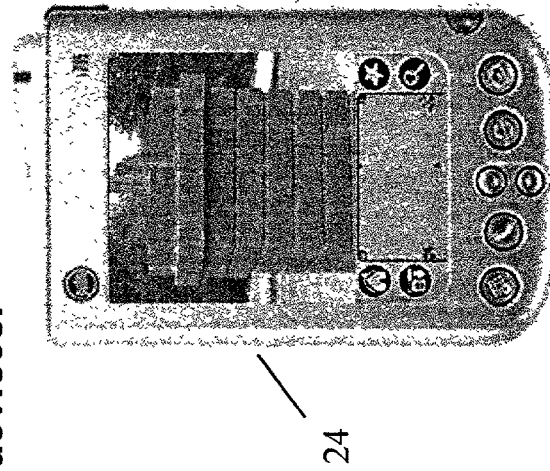
Images viewed on wireless PDA provide more detail but are still limited compared with larger screen on a conventional PC.
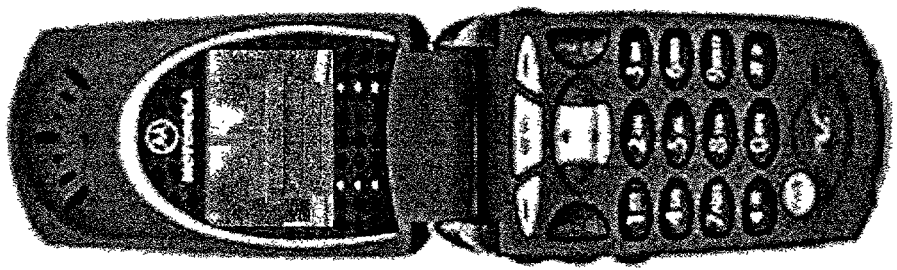
Images can be viewed on mobile phone, but detail is limited due to small screen.
Figure 6

Remote Viewing Construction Site Details via Video-Voicemail

Greatest detail is available on PC with high resolution screen.

VIDEO-VOICEMAIL SOLUTION FOR WIRELESS COMMUNICATION DEVICES

FIELD OF THE INVENTION

This invention relates to the operation of mobile phone communication systems such as those including cellular phones or any form of mobile wireless communication device capable of voice communication, and in particular, enhancements to conventional realtime voice communications and voicemail storage and retrieval systems for mobile phones allowing the integration of still images and video clips.

BACKGROUND

Today, voicemail for mobile phones is simply that, storing voice messages when the receiving party is not available, to be retrieved at a later time. Essentially, voice mail for mobile phones operates in a very similar manner to voicemail for conventional office phones. To date, there has been no attempt to integrate images or video with voicemail for mobile phones or conventional office phones.

Communications between two parties where both voice and video are utilized is well known and is commonly referred to as video conferencing or teleconferencing. Sometimes this capability is also known as a "Net Meeting". Here, a group of individuals, each having a computing device including microphone, speaker, video camera, and a connection to the World Wide Web, are able to communicate in a real-time manner through both video and voice mediums. The ultimate goal of a video conferencing system is to transmit a continuous stream of audio and video to and from each participant in the meeting or conversation, and to emulate as much as possible the interaction that would occur if all participants were in the same room. To do this, there will be compromises and limitations for many years to come relative to the desired functionality for video conferencing due to bandwidth limitations. In contrast to this goal and these compromises, the invention described herein uses existing bandwidth capabilities to selectively integrate images and video with voice communication in order to solve very specific and valuable problems. The manner in which this integration occurs has not been offered before.

The term "videomail" is often used in the industry, but in contrast to voice mail, does not refer to the storage of messages for later retrieval. Instead, it refers to attaching video clips to e-mails and a similar manner to the common practice of attaching files containing digital photographs to e-mails.

Cameras have, at times, been incorporated into mobile phones for surveillance purposes. Instead of broadcasting digital video via a data link with the mobile/cellular service provider, these phones broadcast an RF signal to a viewing receiver in the same manner as any other covert surveillance camera system.

Digital cameras are available as attachments to some PDAs (Personal Digital Assistants), some of which also are available with wireless connection to a service provider allowing accessibility to the World Wide Web. Some PDAs with wireless Web-interface capability can also function as mobile or cellular phones. Some mobile phones have added PDA capabilities, again with wireless Web-interface capability. Also, some mobile phones now have digital cameras available as options to allow pictures to be captured and attached to emails. However, none such devices offer the integration of still images or video with cellular voice communication or with voicemail for cellular phones following the existing paradigm of phone calls and voicemail messages.

A very successful capability offered by one cellular service provider (the Nextel Direct Connect® digital two-way radio service), allows frequent communications among a group of individuals who work closely together to be more convenient and less costly. As a result, this capability has been adopted by the majority of businesses that require frequent communications with individuals working at different locations in a local area, for the most part, businesses in the construction industry. This allows a manager, foreman, or responsible person to more easily keep track of the progress at a variety of locations, and more readily communicate to affect swift problem resolution. Unfortunately, these communications rely on the ability of the individuals involved to clearly describe situations and problems they observe in terms that the responsible person can understand in order to best make decisions and guide the remote workers. The ability for the responsible person to see the subject or problem area would significantly enhance the value of these communications.

A solution is needed that, given the bandwidth limitations of current and next generation cellular data transmission capability, provides an easy way for persons to communicate image and video information, while maintaining a communication paradigm that is familiar, basically the paradigm of phone calls and voicemails. Such a system would allow high resolution images to be transmitted when a high level of detailed is required, and alternately, video clips (which may be at lower resolutions) where spatial relationships and or motion information is required.

SUMMARY

An enhanced communication and voicemail solution for mobile phones is described where still images and/or video clips are injected into the voice stream creating a "video-voice" call. When a receiving party is not available to take a video-voice call, this combined stream of voice and image information is stored at the mobile service provider in a manner similar to voice mail today. Then, stored video-voicemails may be retrieved at a later time by the receiving party. While the sending party may use a normal size mobile phone containing a miniature digital camera, the receiving party may view video-voicemail images on a variety of devices including a wireless mobile phone or PDA, or alternately a conventional PC connected to the World Wide Web.

Compared with continuous, full motion video, occasionally injecting a still image or video clip into the voice stream allows much higher resolution images to be sent given bandwidth limitations, allowing the receiving party to view a subject or situation in much greater detail. For use in business applications, conveniently viewing this more detailed information, synchronized with voice explanations, enables better decisions thereby saving time and money.

BRIEF DESCRIPTION OF THE DRAWINGS

The present invention is described with respect to particular exemplary embodiments thereof and reference is accordingly made to the drawings in which:

FIG. 6 shows a variety of wireless communication devices having digital communications capability for displaying the images from video-voice messages, with emphasis on the variation in aspect ratio of the displays.

DETAILED DESCRIPTION OF THE INVENTION

A better way to communicate between persons operating at remote locations and a manager, advisor, or person in authority, would include interspersing images and/or video clips within the voice communication stream, whether or not it is real time or a voicemail message left for future retrieval. Such a solution utilizes video clips where they are most effective (even with reduced resolution)—conveying motion information, or alternately conveying spatial information of the subject area by way of a "Pan" motion with the camera. In addition, high resolution still images can be injected into the voicestream to allow a very detailed view of a particular subject or problem area, synchronized with a verbal description and other related discussion.

Many applications will benefit from this new capability, including the construction industry, the medical and care industry, field service and repair, building inspection, insurance adjusters, or any application where people need a convenient way to document situations at remote locations and make this information available to others. Another specific application that will benefit from video-voice communications is that of emergency situations. When someone calling 911 to report an emergency can also provide video clips and high resolution still images, a dispatcher or paramedic receiving the call can much better understand the situation and even instruct the caller in a way that may save lives.

In general, integrating this capability with the familiar paradigm of the mobile phone call and voicemail is most convenient and useful. As discussed earlier, it is known to attach digital photos and digital video clips to emails. Emails are inherently digital, so this attachment is natural. Emails are also not a realtime communications medium. However, it is not known to attach digital photos and digital video clips to voice communications, whether realtime or as stored messages.

Note that, throughout this specification, the terms "mobile phone", "cellular phone", and "wireless phone" are synonymous and refer to any mobile communications device capable of bi-directional voice communication.

Figure 1:
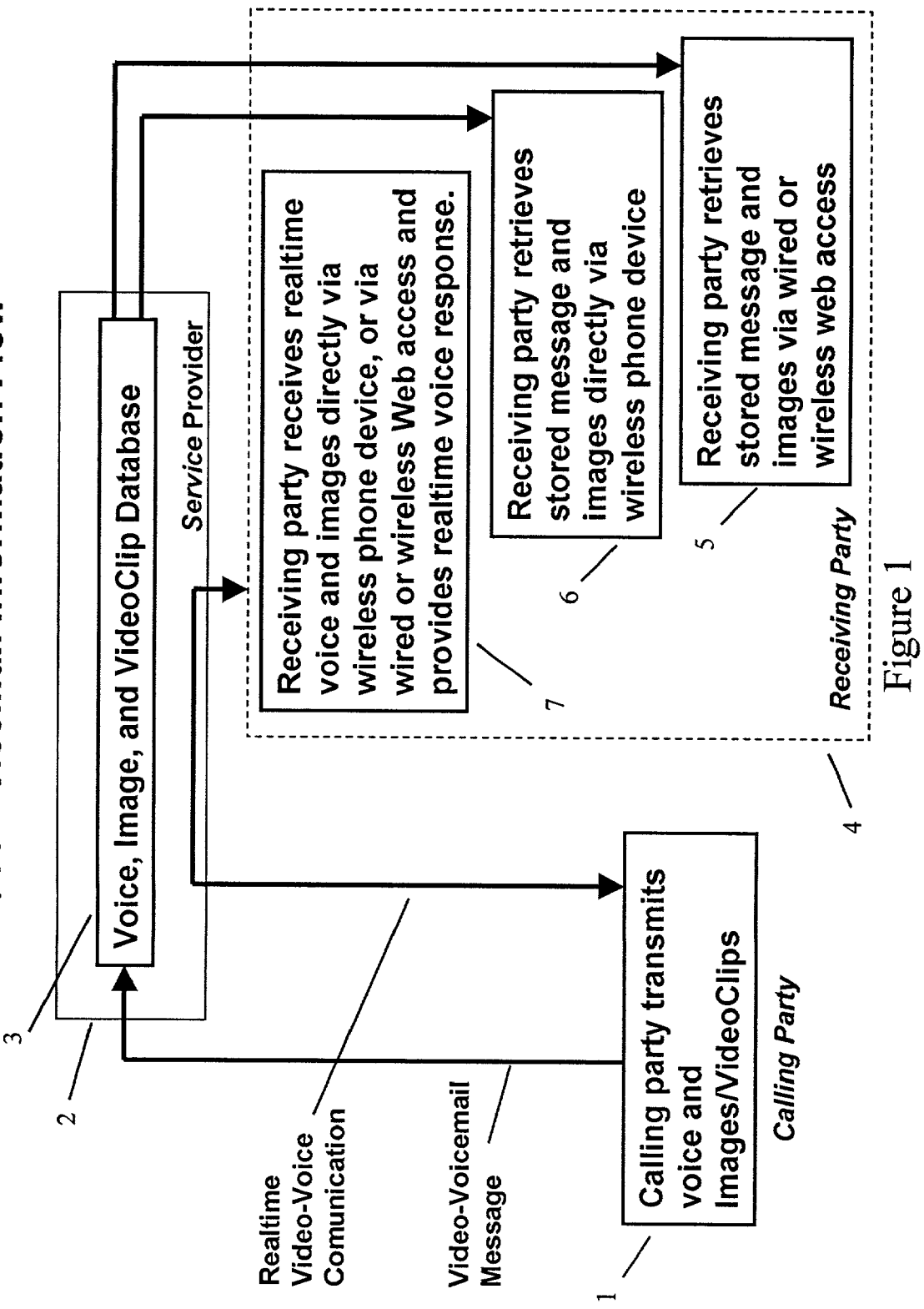
FIG. 1 shows a flow chart for voice and image information within the scope of the present invention.

FIG. 1 shows a flow chart for voice and image information within the scope of the present invention. Here, calling party 1 transmits a stream of voice information with still images and/or video clips interspersed throughout. These may be part of a real-time conversation with receiving party 4 where the receiving party interactively communicates (voice) with the calling party while receiving images that are displayed on the receiving device. Scenario 7, describing the receiving party's communication during a realtime conversation, indicates that the receiving party may communicate via some form of wireless phone device with digital capability communicating directly via the service provider, or alternately may communicate through the World Wide Web using a conventional PC with multimedia and voice communication capability (i.e., speaker and microphone or some form of headset).

If the receiving party is not available for realtime communications, a message may be stored at service provider 2 in database 3 designed to store voice, image, and video clip information while retaining the time relationships between the three. Per scenario 6, the retrieving party accesses previously stored voice, image, and video clip information directly from the service provider via some form of wireless phone device. Alternately, per scenario 5, the receiving party may access stored voice, image, and video clip information via the World Wide Web through either wired or wireless Web access. Although FIG. 1 only shows one mobile service provider, it is possible that there is more than one service provider in the link shown between the calling party and the receiving party. For simplicity, only one is shown here. Throughout this specification and the attached claims, the term "mobile service provider" will refer to one or more service providers who support mobile (or cellular or wireless) communication.

For cellular voice communications today, real-time conversations are never recorded. Only voicemail messages are recorded. As relates to video-voice conversations, it is however useful to record real-time communications that contain either still images or video clips injected into the voice stream. This may be desired in order to document the visual information being conveyed as part of the conversation for later retrieval. It may also be desired when the receiving party answers a call and, as part of the conversation, subsequently realizes that images or video clips are being transferred, but can't properly or safely view them.

With the ability to have voicemail or video-voicemail messages stored at the mobile service provider retrieved via the World Wide Web, users can archive conversations, voicemail messages, and video-voicemail conversations and messages on their personal or business computer system. Today, there is not a convenient way to archive mobile voicemail messages.

If the receiving party is not in a position to view these images real-time, such as when driving a car, having the conversation recorded including all images will allow them to review the visual and audio information by retrieving the recorded message at a later time. Alternately, if the receiving party is driving or otherwise in a situation where viewing is inconvenient or impossible, it may be useful to have the ability to transfer a real-time conversation into video-voicemail, if the conversation reaches a point where it is meaningless to continue real-time without the receiving party being able to view the images or video clips. This capability may be implemented by always recording realtime video-voice conversations at the mobile service provider, and discarding the information at the end of the conversation if the receiving (or calling) party has not taken some action (like pressing some button) to initiate the saving of the video-voice conversation. Alternately, the user could set the default mode to be that of automatically saving conversations, deleting them later if not needed or deleting them after they have been downloaded via the Web and archived. A variation on this these would include automatically saving conversations from a particular calling party, and deleting them later if not needed or deleting them after they have been downloaded via the Web and archived. The accumulation of information resulting from these recording scenarios would require a much larger amount of memory for storing messages at the service provider, but if this is valuable, it is a service that users would be willing to pay extra for.

The scenarios just described can also be applied to recording realtime voice conversations for later retrieval and archive. Even archiving voice alone can be a powerful tool within business applications. For recording realtime conversations, the issue of permissions and privacy arises. One easy to handle the granting of "permission to be recorded" would be that permission is deemed to be given to record conversations from or to a particular phone number by calling from that particular phone number and taking a prescribed action which could include entering a specified code. It may instead be desired to record only video-voice conversations and not voice-only conversations, again with permissions having been given.

Although the essence and value of a video-voice conversation as described herein is bi-directional for voice communication, but mostly or solely unidirectional with regard to the transmission of video clips and still images, the methods described may in certain circumstances, be valuable in a bi-directional manner. For instance, a worker at a jobsite may send images to a supervisor at a remote location, and the supervisor may, in return, send an image of a portion of a blueprint while pointing out some specific details to resolve certain issues. Of course, this requires that the worker have a device with a display capable of presenting the blueprint image with enough resolution to properly discriminate the necessary information.

Another purpose for recording video-voice messages involves a reverse scenario where the supervisor/foreman/responsible party may wish to record information and instructions concerning a particular job site, such that the information and instructions may be viewed by workers at a later time before commencing work or as part of problem resolution during the job.

Figure 2:
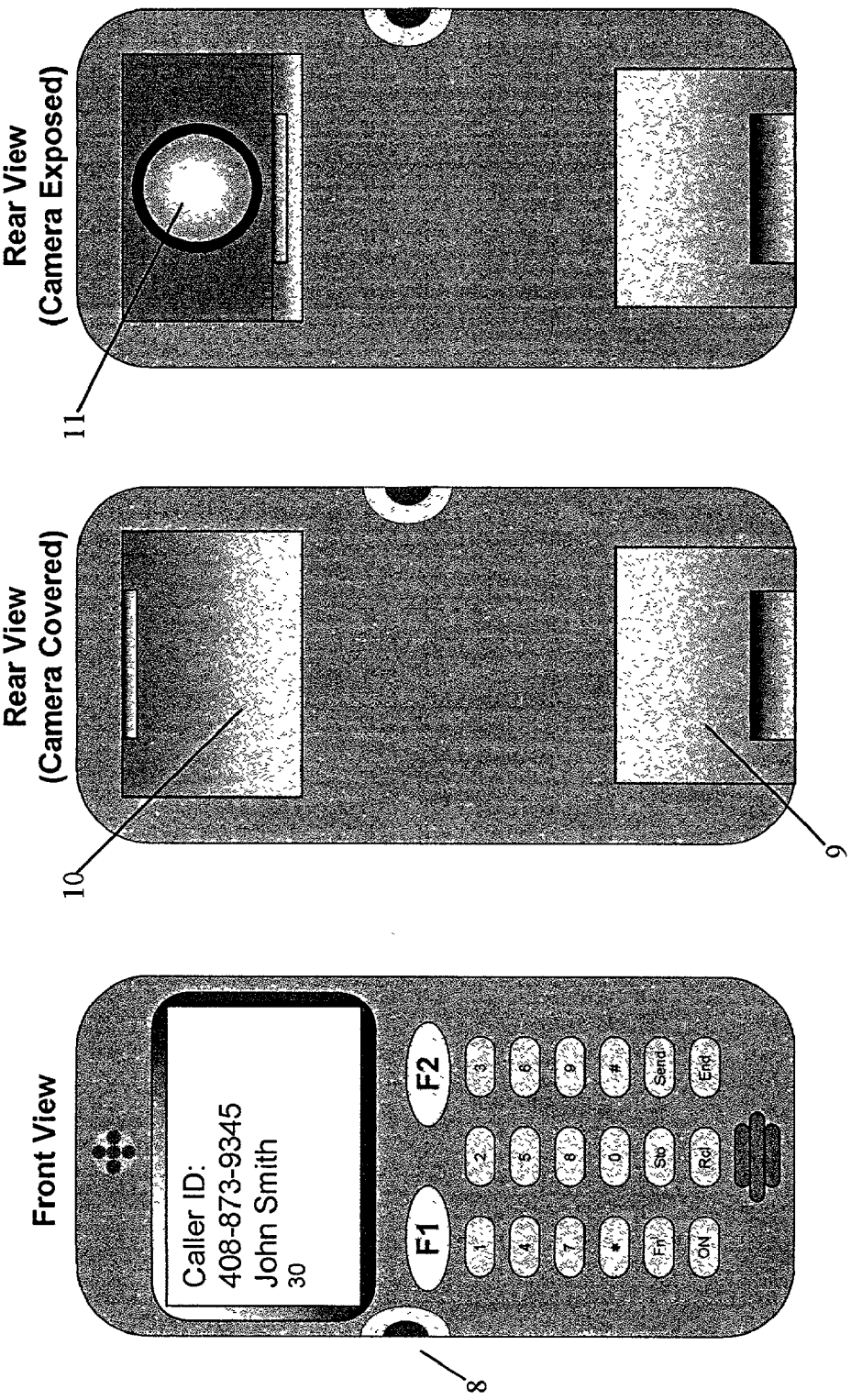
FIG. 2 shows a cellular phone incorporating a digital camera.

FIG. 2 shows one variation of a camera integrated according to this invention with a conventional cellular phone. While cameras are sometimes offered as external options to mobile phones, such solutions may not be rugged enough for business use, especially in the construction industry. Incorporating the camera within the phone is a simpler and more rugged solution. While the variation shown in FIG. 2 does not allow the user to photograph themselves while viewing the display, such as would be required for a mobile video conference or net meeting, this capability is not required where the purpose of the video-voice conversation is remote viewing. FIG. 2a is a front view of the same phone.

Notice in FIG. 2a that button 8 located on left side is positioned such that the index finger of the right hand may easily press this button to activate the "shutter" for the integral digital camera. Alternately, having the button on the right side would allow operation by the index finger if the user's right hand covers the keypad. These alignments would be reversed for a left-handed person. Either way, having the "shutter button" on the side allows a more firm grip on the camera body, allowing a steadier picture, when pushing the "shutter" button.

If the integral camera and associated electronics are designed to allow either still images or video clips to be captured and transmitted, there are at least two methods of utilizing shutter button 8 to easily support both. In the first method, the button may be pressed briefly and released to record a still image, or pressed and held for a longer duration to enable a video clip to be transmitted during the duration of time for which the button is held. In the second method, button 8 may be partially depressed to capture a still image or fully depressed to capture a video clip. Alternately for each of the above methods, which button action captures still images and which captures video clips may be reversed. In addition to the methods just described for determining when video-clips are captured as opposed to still images, a more conventional method can always be utilized where the desired mode of capture is first selected through a key or combination of key presses on the phone's keypad, followed by pressing a "shutter" button.

Although this specification refers to transmitting both still images and video clips, an implementation may only deal with one of the two. If the bandwidth limitations are severe, occasionally injecting high resolution still images into the voicestream is probably more valuable than video clips. Eventually, when the available bandwidth is at a level where high resolution video clips can be easily sent via mobile communications, sending only video clips will be appropriate. In the interim, the combination of high resolution still images and lower resolution video clips may be the best overall compromise.

FIG. 2b shows a rear view of the cell phone revealing battery cover 9 and an integral sliding protective cover 10 that protects the lens for the integral digital camera. The sliding protective cover allows the phone to have a normal conformation when the cover is closed and provides maximum protection for the integral camera. Alternately, an integral protective cover might be hinged at one end and "flip-open" to expose the camera lens. In any case, for a robust solution for business use, an integral protective cover must be always attached to the main body of the phone so that it can be easily restored to its protective position after the user is finished using the camera feature, and so that the cover will never be misplaced or lost.

FIG. 2c shows another rear view of the same phone where protective cover 10 has been withdrawn to reveal camera lens 11. Note that, as for conventional digital cameras and video cameras, an optical zoom capability may be added.

Figure 3:
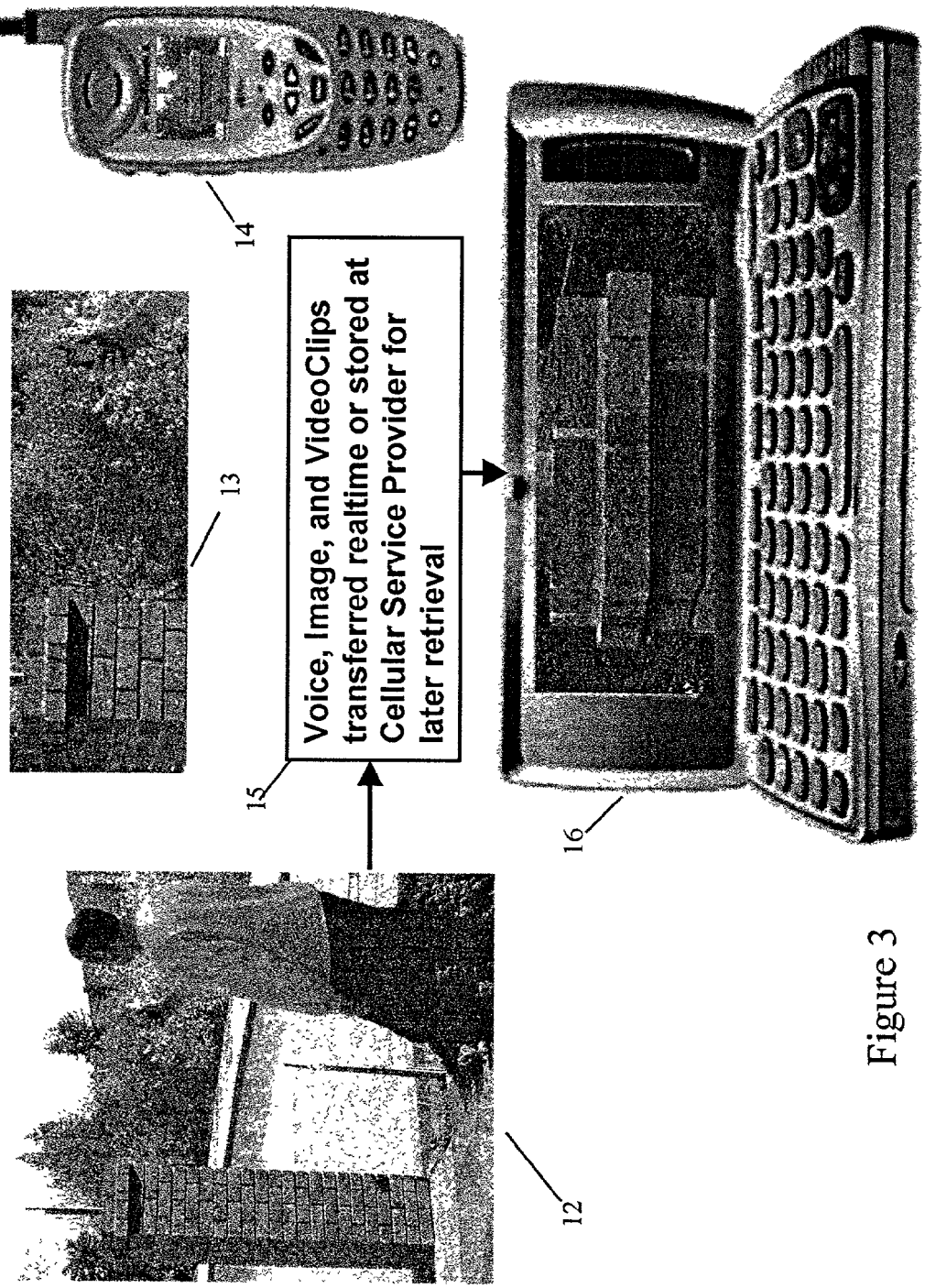
FIG. 3 shows a camera-enabled cellular phone in action with a high-resolution image being viewed remotely on a cellular phone/PDA combination device.

FIG. 3 shows an application example where a construction worker (the sending party), in this case a mason, is communicating with his supervisor regarding a problem with a brick column that has just been constructed. As shown in image 12 and enlargement 13, the sending party is holding the phone in front of them like a camera in order to capture image and/or video information. In this mode, the display on the phone should temporarily act like the viewfinder display on a digital camera. This mode can be activated by a button on the keypad, a push of the shutter button 8, or some other mechanism. When button 8 is released, normal phone display information usually consisting of digits and icons can be optionally superimposed over the camera display, in a black or white (reversed) format.

Since the user of the phone/camera will be holding the device in front of them, they will not be able to talk directly into a normal microphone. Hence, it is necessary to have either a speaker phone capability, or some form of wired or wireless headset to allow bi-directional voice communication while the camera function is being utilized.

Looking again at FIG. 3, voice, image, and video clip information is either transferred in real time by way of the service provider 15 to the receiving party, or alternately is stored as a video-voicemail message at the mobile service provider for retrieval at a later time. In addition, as mentioned previously, a real-time conversation with image and video clips added may also be stored at the service provider to further document a situation for later retrieval. Note that during any conversation where image and video clip information is being transferred, bi-directional voice communication will occur for real-time conversations.

In FIG. 3, the camera is incorporated into a conventional-looking cell phone 14 and is observed by the receiving party on a cell phone/PDA combination unit 16 allowing a larger, more detailed view of images enabling the receiving party to make better decisions.

Figure 4:
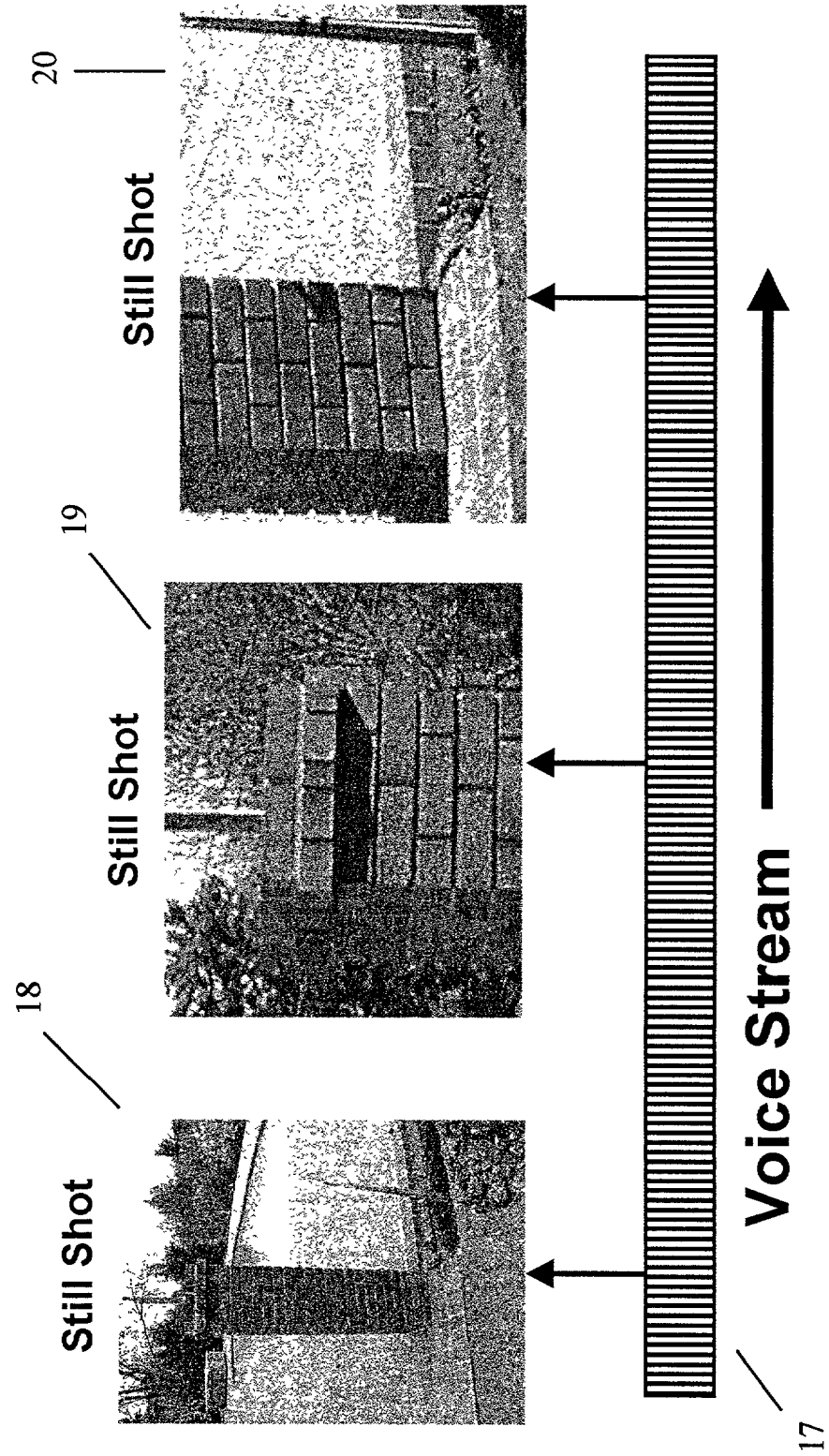
FIG. 4 shows a video-voice message where high resolution still photos have been injected into the voice stream.

FIG. 4 shows how images are positioned in voice stream 17 of a video voicemail conversation with the initial position in time of the images relative to the voicestream being maintained for all such information transmitted. Here three high-resolution still images, image 18, image, and image 20, are injected into the voice stream at different times, a voice description typically coordinated with each image to explain any issues. To allow this discussion to continue while the receiving party is viewing a related image, the last still image transmitted or the last frame of a video clip will typically be maintained on the screen of the receiving device until superseded by another image or video clip, or until otherwise terminated by an action of the receiving party.

Figure 5:
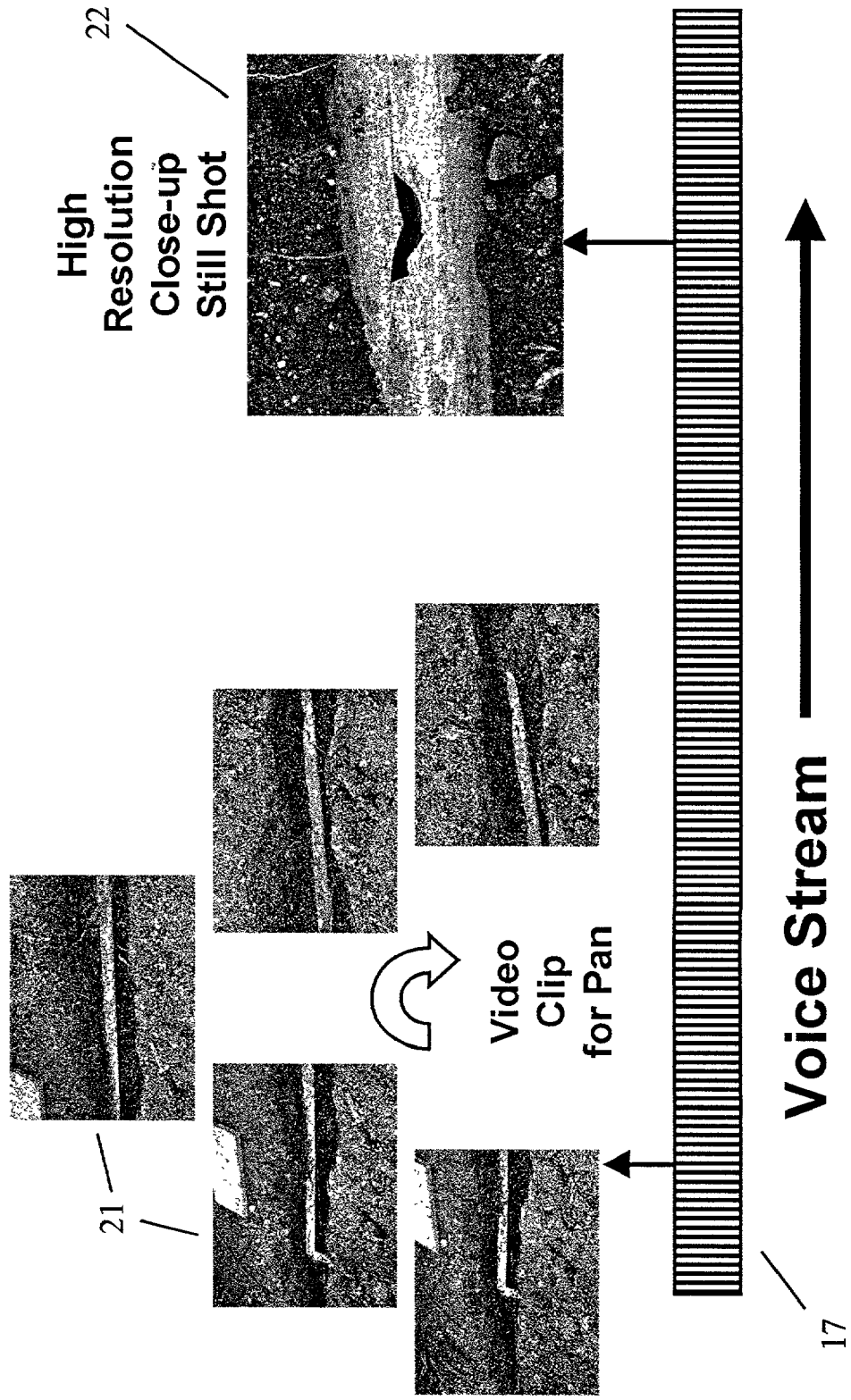
FIG. 5 shows a video-voice message where a video clip and a high-resolution still photo have been injected into the voice stream.

FIG. 5 shows both a video clip sequence 21 and a high resolution still image 22 injected into the voice stream 17, such that the initial position in time of images and video clips relative to the voicestream are maintained for all such information transmitted. Notice that the video clip is able to convey spatial orientation by sweeping (panning) from left to right, thereby positioning a specific focal point properly within its surrounding environment. In this case, a construction crew has uncovered a pipe and in the process has broken it in one specific place. The pan video clip sequence sweeps along the length of the pipe, ending the sequence at the specific location of interest, where high resolution still image 22 provides a close-up detail of the break itself.

Where, according to this invention, video clips or high-resolution still images are injected into the voice stream, the last image to be captured according to the action of shutter button 8 will typically be maintained on the display of the capturing phone for a predetermined time period after button 8 is released, or until otherwise terminated by a subsequent action of the sending party. Also, when button 8 is released, normal phone display information may optionally again be superimposed on the displayed image if desired.

Since it is desired that the party capturing and sending images can clearly and easily observe what images are being captured, it may be necessary to add some form of sun-shade to allow clear observation of an LCD "viewfinder" display on the phone/camera. Alternately, or in addition, it may be useful to add a polarizing filter over an LCD display for better viewing in bright sunlight. Other display technologies, more easily viewed in direct sunlight, may be utilized. It may also be useful to add an optical viewfinder such as those found in many conventional digital cameras.

FIG. 6 shows some examples of additional types of video-voice enabled viewing devices, with emphasis on the variation of aspect ratios among them. Previously, unit 16 in FIG. 3 showed a cellular phone device that opens into a wireless data enabled PDA, having a very wide format screen. Shown additionally in FIG. 6 are a conventional flip-phone 23 having a relatively standard aspect ratio screen, and a wireless enabled Palm Pilot PDA 24, having an aspect ratio that is unusually tall in the vertical direction.

Figure 7:
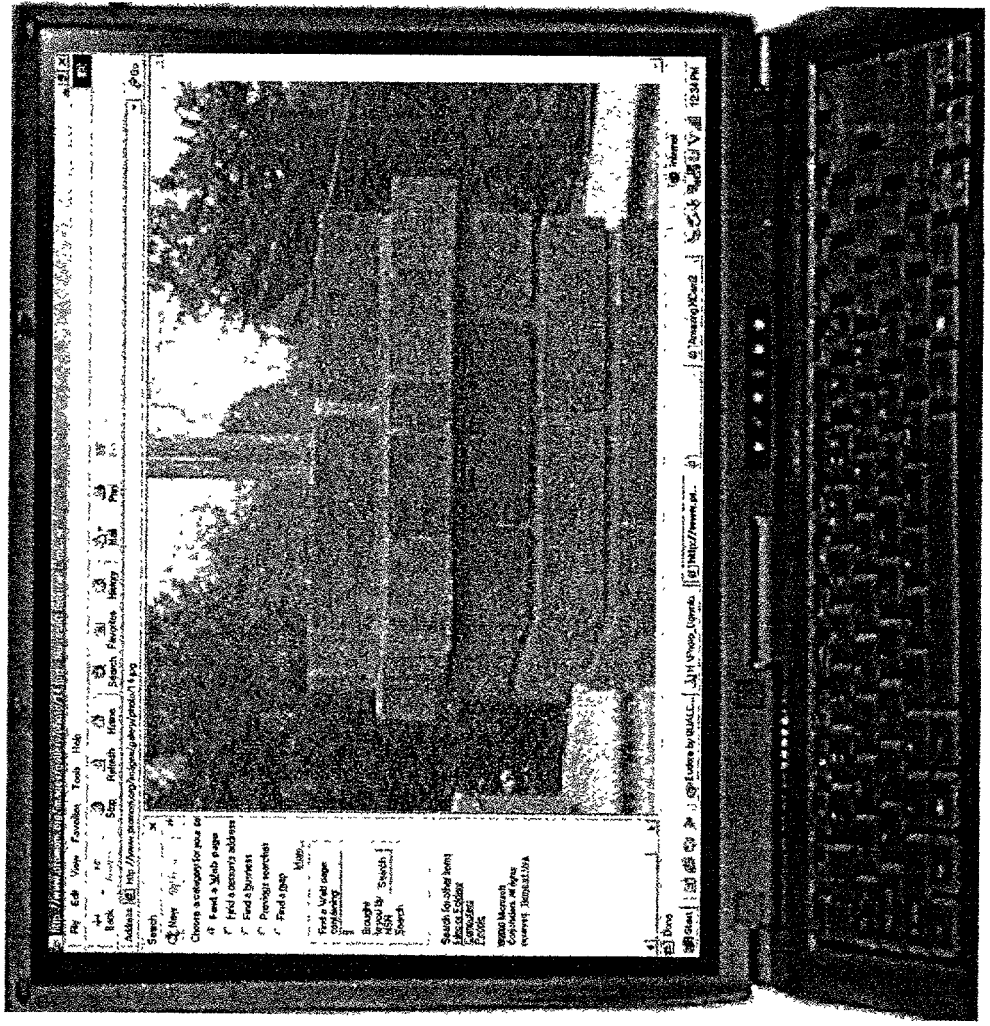
FIG. 7 shows a conventional PC, in this case a notebook computer, having a large high-resolution display, and capable of receiving the video-voice messages through conventional Web access.

FIG. 7 shows a conventional PC 25, in this case a notebook computer with a large high-resolution screen, having a fairly typical aspect ratio. The large variation in aspect ratio between the screens as shown in FIGS. 3, 6, and 7 provides an opportunity to pre-process video clip and image data at the service provider to better match the aspect ratio of a receiving device, before that information is sent to the particular receiving device. Essentially, when matching the aspect ratio of a particular receiving device, there is information that will not be displayed anyway, and removing (cropping) this extraneous information before transmitting, can reduce the amount of time acquired to transmit video clip and image information to a particular receiving device.

Therefore, a methods and apparatus for implementing a combination video/voicemail system especially useful in the construction industry and other industries requiring remote viewing with guidance and supervision, has been described It should be understood that the particular embodiments described above are only illustrative of the principles of the present invention, and various modifications could be made by those skilled in the art without departing from the scope and spirit of the invention. Thus, the scope of the present invention is limited only by the claims that follow.

What is claimed is:

1. A method for transferring video, voice, and still image information during a realtime conversation, wherein video clips and still images are captured by a calling party on a capturing device, said video clips and still images being interspersed in time and combined with a stream of voice information (hereinafter "the voice stream") captured by a wireless communication device, and comprising the steps of:

capturing, from time to time during a realtime conversation, video clips and still images utilizing a digital camera contained within or attached to said wireless communication device;

transmitting said video clips and still images together with and synchronized with the voice stream such that the initial position of each video clip and still image in time relative to the voice stream is maintained;

receiving by a receiving party, on a receiving device having a display and at a remote location and in realtime, said voice stream combined with said video clips and still images, where the initial position in time of each video clip and still image relative to the voice stream is maintained; and where video clips and still images are displayed alternately on the same display; and where the displayed image of each still image or the last frame of a video clip displayed on said receiving device persists until a different still image or video clip arrives in the voice stream, or until otherwise terminated; and storing, at a mobile service provider for retrieval at a later time, said realtime conversation including the voice stream combined with said video clips and still images, while preserving the relationship in time between voice, video and still image information.

2. The method of claim 1 where said realtime conversation, including video clips and still images combined with the voice stream, is optionally recorded at said mobile service provider for later retrieval in response to a decision indication, said decision indication to start said recording being supplied during said video-voice conversation by the receiving party or the calling party.

3. The method of claim 1 where said realtime conversation, including video clips and still images combined with the voice stream, is automatically recorded at said mobile service provider for later retrieval, and where a decision indication causing the contents of said video-voice conversation to be saved is optionally supplied by the receiving party or the calling party during the course of said conversation.

4. A communication system, including a calling party and a receiving party communicating via a mobile service provider, including:

at least one wireless communication device capable of bi-directional voice communication and containing a digital camera, said wireless communication device capable of capturing and transmitting from the calling party to said mobile service provider, video clips and high resolution still images together with and synchronized with a stream of voice information (hereinafter "the voice stream"), said video clips and still images being interspersed in time and where the initial position of each video clip and high resolution still image in time relative to the voice stream is maintained; and at least one receiving device operable by said receiving party, said receiving device having a display and being capable of receiving synchronized voice, video clip, and high resolution still image information from said mobile service provider, either through a wireless connection or through the World Wide Web, and where each video clip and still image is displayed on said receiving device such that the initial position in time of each video clip and still image when displayed, is maintained relative to the voice stream; and where video clips and still images are displayed alternately on the same display; and where the most recent still image or the last frame of the most recent video clip, whichever occurred most recently, continues to be displayed on the receiving device's display until a different image or video clip arrives in the voice stream, or until otherwise terminated; and where a realtime conversation including voice, video clip and still image information transmitted by said wireless communication device is stored at said mobile service provider in response to decision indications supplied by both the calling parting and the receiving party during said conversation, said video clip and still image information being stored together with and synchronized with the voice stream.

5. A communication system for communicating between two parties via a mobile service provider, video clip and high resolution still image information together with and synchronized with a stream of voice information (hereinafter "the voice stream"), where video clips and high resolution still images are interspersed in time and where the initial position in time of each video clip and high resolution still image in the voice stream is maintained, including:

at least one communication device capable of transmitting from a calling party to said mobile service provider, voice information, video clips, and high resolution still images together with and synchronized with the voice stream; and at least one receiving device having a display and capable of receiving at a receiving party, synchronized voice, video clip, and still image information from said mobile service provider, either through a wireless connection or through the World Wide Web; and where each video clip and still image is displayed on said receiving device such that the initial position in time of each video clip and still image when displayed is maintained relative to the voice stream and where video clips and still images are displayed alternately on the same display; and where the displayed image of each still image or the last frame of a video clip displayed on said receiving device persists until a different still image or video clip arrives in the voice stream, or until otherwise terminated; and a storage system at said mobile service provider for storing said voice information, video clips, and high resolution still images while maintaining the initial position in time of said video clips and high resolution still images in the voice stream; and where information communicated from a calling party is optionally recorded for retrieval at a later time if the receiving party decides, during a realtime conversation, that said information should be recorded.

6. A communication system for communicating between two parties via a mobile service provider, video clip and high resolution still image information together with and synchronized with a stream of voice information (hereinafter "the voice stream"), where video clips and high resolution still images are interspersed in time and where the initial position in time of each video clip and high resolution still image in the voice stream is maintained, including:

at least one communication device capable of transmitting from a calling party to said mobile service provider, voice information, video clips, and high resolution still images together with and synchronized with the voice stream; and at least one receiving device having a display and capable of receiving at a receiving party, synchronized voice, video clip, and still image information from said mobile service provider, either through a wireless connection or through the World Wide Web; and where each video clip and still image is displayed on said receiving device such that the initial position in time of each video clip and still image when displayed is maintained relative to the voice stream; and where video clips and still images are displayed alternately on the same display; and where the displayed image of each still image or the last frame of a video clip displayed on said receiving device persists until a different still image or video clip arrives in the voice stream, or until otherwise terminated; and a storage system at said mobile service provider for storing said voice information, video clips, and high resolution still images while maintaining the initial position in time of said video clips and high resolution still images in the voice stream; and where a receiving party may choose to have all incoming information recorded for retrieval at a later time, selectively deleting information for individual conversations at a later time.

7. A communication system for communicating between two parties via a mobile service provider, video clip and high resolution still image information together with and synchronized with a stream of voice information (hereinafter "the voice stream"), where video clips and high resolution still images are interspersed in time and where the initial position in time of each video clip and high resolution still image in the voice stream is maintained, including:

at least one communication device capable of transmitting from a calling party to said mobile service provider, voice information, video clips, and high resolution still images together with and synchronized with the voice stream; and at least one receiving device having a display and capable of receiving at a receiving party, synchronized voice, video clip, and still image information from said mobile service provider, either through a wireless connection or through the World Wide Web; and where each video clip and still image is displayed on said receiving device such that the initial position in time of each video clip and still image when displayed is maintained relative to the voice stream; and where video clips and still images are displayed alternately on the same display; and where the displayed image of each still image or the last frame of a video clip displayed on said receiving device persists until a different still image or video clip arrives in the voice stream, or until otherwise terminated; and a storage system at said mobile service provider for storing said voice information, video clips, and high resolution still images while maintaining the initial position in time of said video clips and high resolution still images in the voice stream; and where a receiving party may choose to have all incoming information from a particular calling party recorded for retrieval at a later time, selectively deleting information for individual conversations at a later time.

8. A communication system for communicating between two parties via a mobile service provider, video clip and high resolution still image information together with and synchronized with a stream of voice information (hereinafter "the voice stream"), where video clips and high resolution still images are interspersed in time and where the initial position in time of each video clip and high resolution still image in the voice stream is maintained, including:

at least one communication device capable of transmitting from a calling party to said mobile service provider, voice information, video clips, and high resolution still images together with and synchronized with the voice stream; and at least one receiving device having a display and capable of receiving at a receiving party, synchronized voice, video clip, and still image information from said mobile service provider, either through a wireless connection or through the World Wide Web; and where each video clip and still image is displayed on said receiving device such that the initial position in time of each video clip and still image when displayed is maintained relative to the voice stream; and where video clips and still images are displayed alternately on the same display; and where the displayed image of each still image or the last frame of a video clip displayed on said receiving device persists until a different still image or video clip arrives in the voice stream, or until otherwise terminated; and a storage system at said mobile service provider for storing said voice information, video clips, and high resolution still images while maintaining the initial position in time of said video clips and high resolution still images in the voice stream; and where a particular calling party and a particular receiving party may choose in advance to have all information, including voice, video clips and still images, exchanged between them during conversations recorded at said mobile service provider for retrieval at a later time.

9. A method for transferring video, voice, and still image information during a realtime conversation, wherein video clips and still images are captured by a calling party on a capturing device, said video clips and still images being interspersed in time and combined with a stream of voice information (hereinafter "the voice stream") captured by a wireless communication device, and comprising the steps of:

capturing, from time to time during a realtime conversation, video clips and still images utilizing a digital camera contained within or attached to said wireless communication device:

transmitting said video clips and still images together with and synchronized with the voice stream such that the initial position of each video clip and still image in time relative to the voice stream is maintained;

receiving by a receiving party, on a receiving device having a display and at a remote location and in realtime, said voice stream combined with said video clips and still images, where the initial position in time of each video clip and still image relative to the voice stream is maintained; and where video clips and still images are displayed alternately on the same display; and where the displayed image of each still image or the last frame of a video clip displayed on said receiving device persists until a different still image or video clip arrives in the voice stream, or until otherwise terminated; and storing, at a mobile service provider for retrieval at a later time, said realtime conversation including the voice stream combined with said video clips and still images, while preserving the relationship in time between voice, video and still image information; and where a particular calling party and a particular receiving party may choose in advance to have all information, including voice, video clips and still images, exchanged between them during conversations recorded at said mobile service provider for retrieval at a later time.

10. A method for transferring video, voice, and still image information during a realtime conversation, wherein video clips and still images are captured by a calling party on a capturing device, said video clips and still images being interspersed in time and combined with a stream of voice information (hereinafter "the voice stream") captured by a wireless communication device, and comprising the steps of: capturing, from time to time during a realtime conversation, video clips and still images utilizing a digital camera contained within or attached to said wireless communication device; and transmitting said video clips and still images together with and synchronized with the voice stream such that the initial position of each video clip and still image in time relative to the voice stream is maintained; and receiving, by a receiving party, on a receiving device having a display and at a remote location, either in realtime or retrieved from a video-voicemail storage system at a mobile service provider, said voice stream combined with and synchronized with said video clips and still images, where the initial position in time of each video clip and still image relative to the voice stream is maintained; and where video clips and still images are displayed alternately on the same display; and where the most recent still image or the last frame of the most recent video clip, whichever occurred most recently, continues to be displayed on the receiving device's display until a different image or video clip arrives in the voice stream, or until otherwise terminated; and where a particular calling party and a particular receiving party may choose in advance to have all information, including voice, video clips and still images, exchanged between them during conversations recorded at said mobile service provider for retrieval at a later time.

11. A communication system, including a calling party and a receiving party communicating via a mobile service provider, including:

at least one wireless communication device capable of bi-directional voice communication and containing a digital camera, said wireless communication device capable of capturing and transmitting from the calling party to said mobile service provider, video clips and high resolution still images together with and synchronized with a stream of voice information (hereinafter "the voice stream"), said video clips and still images being interspersed in time and where the initial position of each video clip and high resolution still image in time relative to the voice stream is maintained; and at least one receiving device operable by said receiving party, said receiving device having a display and being capable of receiving synchronized voice, video clip, and high resolution still image information from said mobile service provider, either through a wireless connection or through the World Wide Web, and where each video clip and still image is displayed on said receiving device such that the initial position in time of each video clip and still image when displayed, is maintained relative to the voice stream; and where video clips and still images are displayed alternately on the same display; and where the most recent still image or the last frame of the most recent video clip, whichever occurred most recently, continues to be displayed on the receiving device's display until a different image or video clip arrives in the voice stream, or until otherwise terminated; and where a particular calling party and a particular receiving party may choose in advance to have all information, including voice, video clips and still images, exchanged between them during conversations recorded at said mobile service provider for retrieval at a later time.

* * * * *